US010198791B2

(12) United States Patent
Angara et al.

(10) Patent No.: US 10,198,791 B2
(45) Date of Patent: Feb. 5, 2019

(54) AUTOMATIC CORRECTION OF FACIAL SENTIMENT OF PORTRAIT IMAGES

(71) Applicant: Adobe Inc., San Jose, CA (US)

(72) Inventors: Srinivasa Madhava Phaneendra Angara, Noida (IN); Lance Lewis, San Ramon, CA (US); Anmol Dhawan, Noida (IN)

(73) Assignee: Adobe Inc., San Jose, CA (US)

( * ) Notice: Subject to any disclaimer, the term of this patent is extended or adjusted under 35 U.S.C. 154(b) by 107 days.

(21) Appl. No.: 15/236,700

(22) Filed: Aug. 15, 2016

(65) Prior Publication Data

US 2018/0047137 A1 Feb. 15, 2018

(51) Int. Cl.
*G06K 9/00* (2006.01)
*G06T 5/00* (2006.01)
*G06K 9/62* (2006.01)

(52) U.S. Cl.
CPC .......... *G06T 5/001* (2013.01); *G06K 9/00255* (2013.01); *G06K 9/00281* (2013.01); *G06K 9/6269* (2013.01)

(58) Field of Classification Search
CPC .......... G06K 9/00255; G06K 9/00281; G06K 9/6269; G06T 5/001
See application file for complete search history.

(56) References Cited

U.S. PATENT DOCUMENTS

2014/0340531 A1\* 11/2014 Jain .................. H04N 5/23222
348/207.1
2016/0078279 A1\* 3/2016 Pitre .................. A61B 5/7264
382/118

\* cited by examiner

*Primary Examiner* — Phuoc Tran
(74) *Attorney, Agent, or Firm* — Finch & Maloney PLLC

(57) ABSTRACT

Techniques are disclosed for correcting facial sentiment of digital images. Facial data captured in a target image is analyzed to obtain facial-based sentiment. A favored sentiment is determined based at least in part on the facial-based sentiment. The favored sentiment is then applied to at least one face included in the target image that doesn't reflect the favored sentiment. Analyzing facial data may include detecting facial landmarks that are good indicators of sentiment (e.g., eyes, mouth, eyebrows, jawline, and nose). Such landmarks can be processed, with supervised machine learning, to detect the corresponding facial sentiment. A favored sentiment of the target image is thus identified, and can be applied to one or more non-compliant faces in the target image. In some embodiments, the favored sentiment can be further based on a plurality of additional sentiment indicators, including geo data, text, and/or other images associated with the target image.

18 Claims, 12 Drawing Sheets
(5 of 12 Drawing Sheet(s) Filed in Color)

AUTOMATIC CORRECTION OF FACIAL SENTIMENT OF PORTRAIT IMAGES

FIELD OF THE DISCLOSURE

This disclosure relates to digital image editing, and more particularly, to techniques for automatically correcting facial sentiment of portrait images.

BACKGROUND

The sentiment of a digital image is important piece of information that one should understand. This is particularly true for artists, authors, and multimedia content publishers. For example, consider the example scenario where an article to be published is intended to convey a certain sentiment, such as joy or sadness, and the article is to be accompanied by a digital image showing the faces of a number a people. The article could be, for instance, a fictional story, and the photo could be one or more persons representing characters in the story. Of course numerous other multimedia digital content scenarios are possible, including non-fictional articles, reports, marketing and promotional literature, and presentations, to name a few examples, any of which can be combined with digital imagery including one or more faces. In any such cases, if the facial expressions of the people in the image don't quite match the sentiment of the content, then the author may wish to make a small but relevant correction to the image, so that the sentiment reflected by the expressions of the people in the image is more consistent with the content of the article. To address this issue, the author (or publisher, as the case may be) will have to access the image in question with an image editing application and proceed to manually correct each and every facial expression that doesn't match with the context or the article. This can be a difficult and time consuming process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
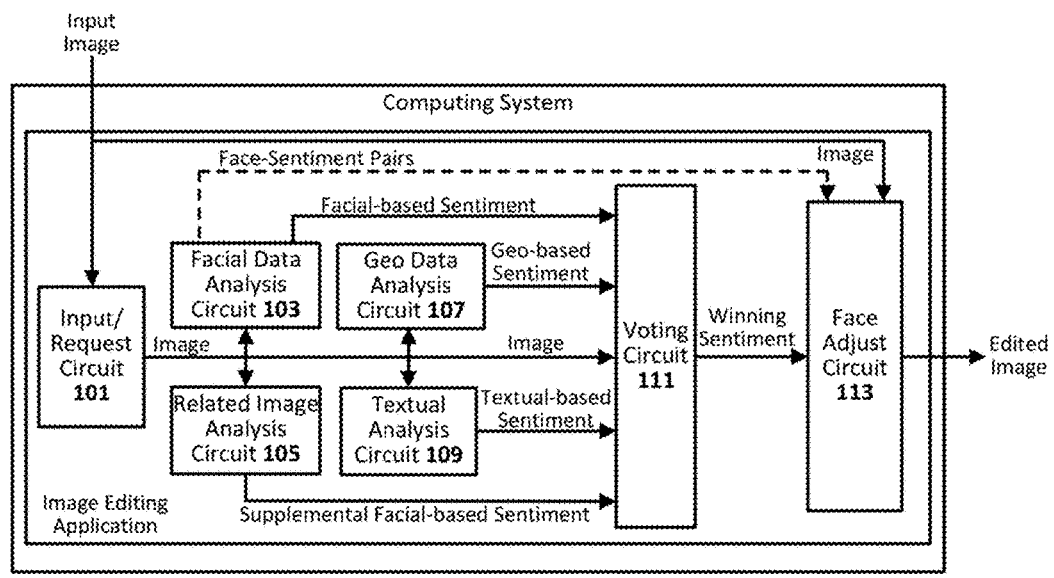
FIG. 1a illustrates a computing system including an image editing application configured to automatically correct facial sentiment of a portrait image, in accordance with an embodiment of the present disclosure.

Techniques are disclosed for automatically correcting facial sentiment of portrait digital images. So, for example, if a given digital image shows two happy faces and a third neutral face, that neutral face can be automatically adjusted to look happier. In an embodiment of the present disclosure, techniques are coded to provide a computer-implemented methodology. The methodology includes analyzing facial data captured in a given target image to obtain facial-based sentiment. A favored or otherwise winning sentiment is determined based at least in part on the facial-based sentiment. The winning sentiment is then applied to at least one face included in the target image that doesn't reflect the winning sentiment. In some embodiments, analyzing facial data of the target image to obtain facial-based sentiment includes detecting landmarks of each face detected in the image. The landmarks effectively define facial features that are good indicators of sentiment, such as eyes, mouth, eyebrows, jawline, and nose, to name a few examples. Such facial landmarks can be processed, with supervised machine learning and classification, to detect the sentiment on the faces captured in the image. A most-favored (winning) facial sentiment of the target image can then be identified. That winning facial sentiment can then be applied to one or more faces in the target image not currently having that favored sentiment.

In some embodiments, the favored sentiment can be based on a plurality of sentiment indicators. For instance, in addition to analyzing facial data captured in a given target image to obtain facial-based sentiment, the methodology may further include analyzing other images related to the target image to obtain supplemental facial-based sentiment. Likewise, the methodology may further include analyzing geo data of the target image to obtain geo-based sentiment. Likewise, the methodology may further include analyzing textual data associated with the target image to obtain textual-based sentiment. In such cases, the winning sentiment can be further based on at least one of the text-based sentiment, the supplemental facial-based sentiment, and the geo-based sentiment. Note that the other images can be related to the target image based on, for example, the time and location at which they were captured (e.g., a group of photos all captured around the same time at the same geographic location, which typically indicates the photos are related and include common subject matter and people).

Further note that the textual content, if present, can be within and/or proximate to the target image. In any such cases, applying the winning sentiment to at least one face included in the target image may include, for example, identifying faces in the target image that do not match the winning sentiment, and modifying one or more landmark features of each face that does not match the winning sentiment. Thus, an edited version of the target image is provided with corrected facial sentiment.

As will be appreciated, a portrait image as used herein includes any digital photograph having one or more human faces captured therein. However, a portrait image may also include animated faces or virtual faces or computer-generated faces. In addition, a portrait image may also include even more abstract faces such as cartoon faces and faces that have fewer than all typical facial features, such as a smiley face having only eyes and a mouth. In a more general sense, a portrait image is any digital content having a collection of facial features that convey a specific facial sentiment. The collection of facial features can be, for example, eyes and a mouth, or eyes, nose, and mouth, or eyes, eyebrows, nose and mouth, or eyes and eyebrows, or eyes, mouth, and jawline, etc. Further note that some facial features that are normally dominant may be minimized on a given face (e.g., nose depicted with a dot). In any such cases, the sentiment expressed generally will depend on the complexity of the facial features captured in the image, and may be, for instance, joy, sadness, neutral, surprise, anger, disgust, and fear, to name a few example sentiments. A machine learning process can be trained to identify a finite set of facial sentiments based on a known set of facial features or landmarks. Once a desired sentiment is identified, a non-complying sentiment of a given face captured in any such portrait images can be automatically adjusted to change the sentiment conveyed by that face, according to an embodiment.

Architecture and Methodology

Figure 1B:
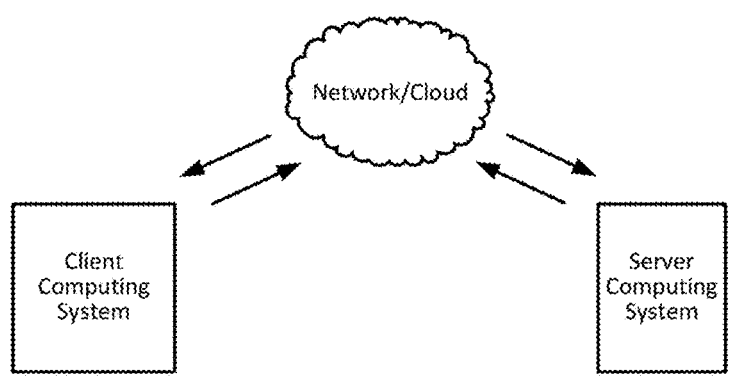
FIG. 1b illustrates a client-server system configured to automatically correct facial sentiment of a portrait image, in accordance with another embodiment of the present disclosure.

FIG. 1a illustrates a computing system including an image editing application configured to automatically correct facial sentiment of a portrait image, in accordance with an embodiment of the present disclosure. As can be seen, the image editing application is executable on a computing system and generally includes an input/request circuit 101, a facial data analysis circuit 103, a related image analysis circuit 105, a geo data analysis circuit 107, a textual data analysis circuit 109, a voting circuit 111, and a face adjust circuit 113. FIG. 1b shows a computing system similar to that shown in FIG. 1a, except one or more of the components and features of the image editing application are provided to the computing system by a remote server computing system accessible via a communication network or cloud-based service. The communication network can be any wired and/or wireless network such as, for example, a wireless local area network operatively coupled to the Internet, or a campus wide network. Any number of communication networks and protocols and client-server arrangements can be used.

The image editing application may be any product programmed or otherwise configured to allow for editing of digital images. The editing may be done, for example, in the context of a multimedia project that includes other content (e.g., such as text, graphics, audio, and/or video), or simply in the context of a dedicated photo editing application. In one example embodiment, the application is the Adobe® Comp CC application, which allows users to open an image of a given project in the Adobe® Photoshop® Fix application. In another example embodiment, the application is the Adobe® Photoshop® application, or other dedicated photo editing app. Such software applications can be installed directly on the computing system in a standalone fashion (such as shown in FIG. 1a), or accessible to the computing system through a cloud-based service (such as shown in FIG. 1b). In any case, the user can correct the sentiment of each face in a given image that doesn't match the target sentiment. As will be appreciated in light of this disclosure, the target sentiment can be identified using one or more avenues of sentiment-indicating information and effectively informs the automatic sentiment correction process.

The operation of the systems shown in FIGS. 1a and 1b will be discussed with reference to FIG. 2a, which illustrates a computer-implemented method for automatically correcting facial sentiment of a portrait image, in accordance with an embodiment of the present disclosure. As can be seen, the methodology includes receiving 201 a request to correct facial sentiment in a given target image, which can be carried out by the input/request circuit 101. In some embodiments, the input/request circuit 101 is programmed or otherwise configured to respond to a user-based selection of an image. The user-based selection can be provided, for example, by a mouse click or tap on the image of interest. This selection may in turn cause the input/request circuit 101 to present a menu of options to the user, with one of the options being "Correct Sentiment", for example. One such example embodiment is shown in FIGS. 2b and 2c. As can be seen, a multimedia project has been authored using a digital content creation application, such as Adobe® Comp CC, although any suitable content creation app can be used. The example project generally includes an image portion and a number of text portions. The multimedia project may be, for instance, a webpage design, marking literature, a fictional story, a presentation, or any other multimedia project. In any case, the author of the project wishes to correct the sentiment of the third face shown in the image portion (perhaps, for example, that person ate too much pie and needs a little help to look happier). So, the author selects the image portion of the project (using a cursor in the example scenario shown in FIG. 2b). In response to the selection, the input/request circuit 101 causes a pop-up menu to appear that includes a number of options, including: Copy, Correct Sentiment, Delete, Edit, and Send. The author then selects the Correct Sentiment option (with an appropriately placed place click of the cursor), thereby invoking the automatic sentiment correction feature. The result is shown in FIG. 2c, which shows the third person in the target image with a happy face, despite having too much pie onboard. Thus, the expressions of all three people in the target image have effectively been equalized. Any number of image selection and user interface techniques can be used here, as will be appreciated.

Once a target image has been selected, the methodology continues with analyzing 203 facial data of the target image to obtain facial-based sentiment, which is carried out by the facial data analysis circuit 103. In general, circuit 103 is programmed or otherwise configured to detect certain landmarks of each face depicted in the image, and determine the sentiment of each face based on those landmarks. In one such embodiment, a detected set of landmarks for a given face is processed through a sentiment classifier trained or otherwise configured to identify the sentiment associated with the landmark set. If multiple sentiments are detected, circuit 103 is further configured to detect and classify each of the sentiments, and to output a most-favored sentiment. A most-favored sentiment can be, for example, the only sentiment detected in a given image. Alternatively, a most-favored sentiment can be a statistically relevant sentiment, such as a most frequently occurring sentiment based on multiple sentiments detected and tallied for a given image. Note that the facial data analysis circuit 103 can also provide the sentiment of each face detected in the target image to the face adjust circuit 113, by way of the face-sentiment pairs (shown with dashed line). Further details of circuit 103 will be provided with reference to FIGS. 3*a-h*.

The methodology continues with analyzing 205 related images of the target image to obtain supplemental facial-based sentiment, which is carried out by the related image analysis circuit 105. The related images can be, for example, images included in a group of images that further includes the target image. Images of such a group can be identified, for example, by the time and location at which they were captured. Thus, in some embodiments, a preliminary examination can be carried out on images suspected to be related to the target image to evaluate the time and location of capture, as well as other factors such as clothing on a given person and other tell-tale signs that an image is related to a group of images. In any such cases, the related images may be stored, for instance, locally on the computing system (e.g., on-device image gallery) and/or remote from the computing system (e.g., cloud-based photo storage facility accessible by the communication network shown in FIG. 1*b*). Once the related images are identified, they can be further processed by the related image analysis circuit 105 to identify a most-favored sentiment for each person observed in the images. The processing by circuit 105 can be similar to that of facial data analysis circuit 103 (e.g., sentiment classification based on detected facial landmarks). A tally of differing sentiments captured in the related images from all the faces detected therein can thus be computed and an overall most-favored sentiment can be identified and output by circuit 105. Further details of circuit 105 will be provided with reference to FIG. 4.

The methodology continues with analyzing 207 geo data of the target image to obtain geo-based sentiment, which is carried out by the geo data analysis circuit 107. In general, each image can be evaluated for geo data indicative of the geographic location at which the image was taken. For example, in some embodiments, each of the images, including the target image and any related images, is associated with GPS coordinates that are embedded in the digital image file by the camera device that generated the image. Smartphones, for instance, are now typically configured with a GPS receiver and a camera, which makes providing images tagged with geo data a common practice. In still other embodiments, if no embedded GPS or other coordinate data is available to assist in identifying the geographic location at which the image was captured, then each image may be subjected to image analysis to identify features like street addresses and famous landmarks and waypoints. Standard image processing can be used, including segmentation and optical character recognition, to identify and extract imaged content indicative of geographic location. In any such cases, once the geographic location at which an image was captured is identified, the geo data analysis circuit 107 is further configured to determine the sentiment of that that location and output. Further details of the circuit 107 will be explained with reference to FIG. 5.

The methodology continues with analyzing 209 textual data associated with the target image to obtain textual-based sentiment, which is carried out by the textual data analysis circuit 109. In general, each image can be evaluated for textual content indicative of the overall sentiment under which the image is being presented. For example, in some embodiments, the target image may be juxtaposed with textual content such as an article or narrative about an event at which the image was taken. The layout of the text may be, for example, a multimedia project as shown in FIGS. 2*b* and 2*c*. As previously explained, the example multimedia project includes an image portion and a number of text portions, where the text is proximate to or otherwise external to the image. In still other embodiments, each image is also (or alternatively) subjected to image analysis to identify textual content within the image itself that may be indicative of the sentiment, just as textual content external to the image may be. Standard image processing can be used, such as optical character recognition and possibly segmentation, to identify and extract such imaged textual content. In any case, once the textual content associated with a given image is identified, the sentiment of that that textual content can be determined and output by the textual analysis circuit 109. Further details of circuit 109 will be explained with reference to FIG. 6.

Figure 2A:
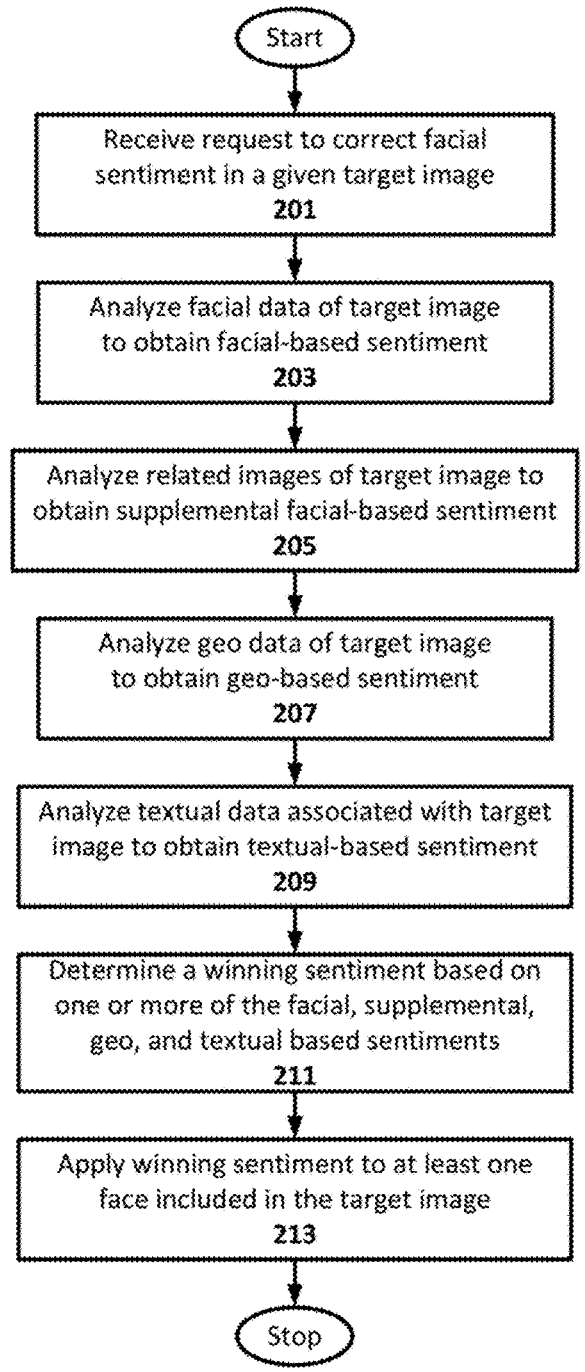
FIG. 2a illustrates a computer-implemented method for automatically correcting facial sentiment of a portrait image, in accordance with an embodiment of the present disclosure.
Figure 2B:
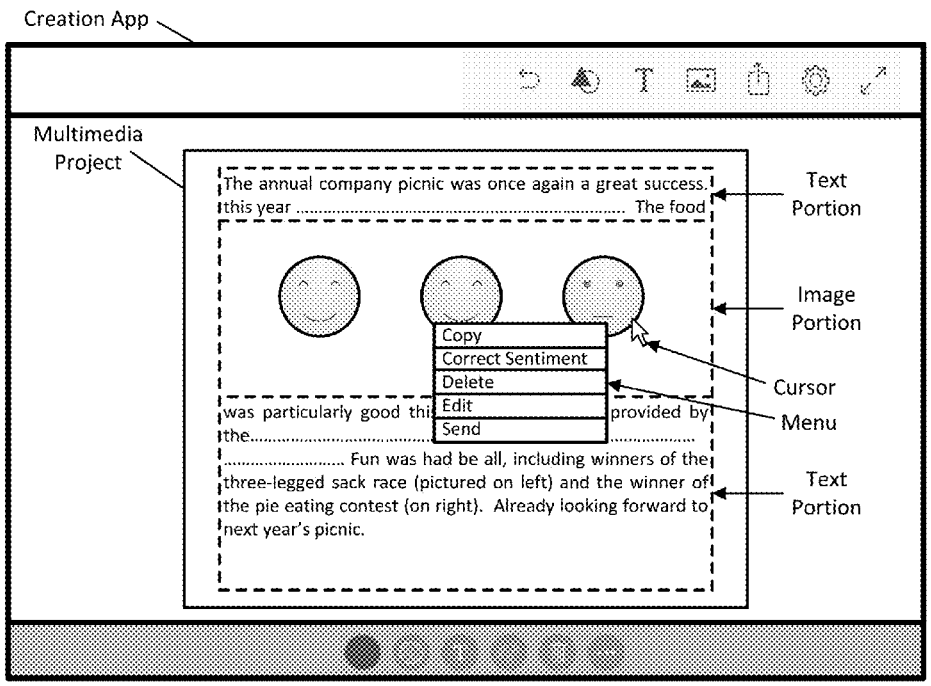
FIGS. 2b and 2c illustrate example screen shots of a multimedia application configured to automatically correcting facial sentiment of a portrait image, in accordance with an embodiment of the present disclosure.
Figure 2C:
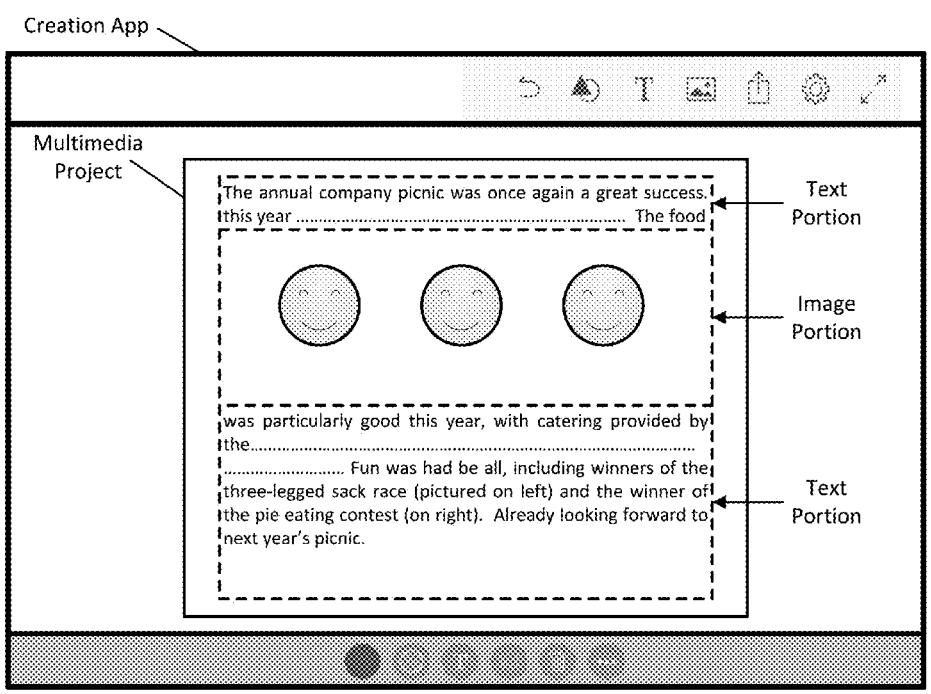

With further reference to FIG. 2*a*, the methodology continues with determining 211 a winning sentiment based on one or more of the facial, supplemental, geo, and textual based sentiments, which is carried out by the voting circuit 111 to identify a winning or most-favored sentiment. As can be seen in FIG. 1*a*, the voting circuit 111 receives each of the facial, supplemental, geo, and textual based sentiments, and is programmed or otherwise configured to calculate the most-favored sentiment represented by the various sentiments that are actually received. Again, the most-favored sentiment can be, for example, the only sentiment detected or alternatively the sentiment that was detected the most among a multitude of detected sentiments. If there is a tie, then the voting circuit 111 may be further configured to weight certain sentiments or otherwise cast a tie-breaking vote. In any such cases, once the various available sentiments are identified and tallied, a winning sentiment is declared and output by the voting circuit 111. Additional details of the voting circuit 111 will be explained with reference to FIG. 7.

The winning sentiment provided by circuit 111 can then be used to inform the automatic sentiment correction process. For instance, with further reference to FIG. 2*a*, the methodology continues with applying 213 the winning sentiment to at least one face included in the target image, which is carried out by the face adjust circuit 113. As can be seen in FIG. 1*a*, in addition to having access to or otherwise being aware of the target image selected for sentiment correction, the circuit 113 is aware of the sentiment on each face captured in the target image, by way of the face-sentiment pairs provided by the facial data analysis circuit 103. In addition, the circuit 113 is further aware of the winning sentiment, by way of the voting circuit 111. Thus, the circuit 113 is programmed or otherwise configured to identify one or more faces detected in the target image that don't match the winning sentiment, and to automatically adjust at least one facial feature of non-compliant faces thereby correcting that face to have to have the winning sentiment. Additional details of the voting circuit 111 will be explained with reference to FIG. 8.

As will be appreciated, each of the circuits 101 through 113 can be implemented in hardware, firmware, software, or some combination thereof. In one example embodiment, one or more of the circuits is implemented with software instructions executing on one or more processors. In this sense, the combination of software and the one or more processors provide a functional and structural circuit configured to carry out the functionality as variously provided herein. In another example embodiment, one or more of the circuits is implemented with gate-level logic or other suitable hardware (e.g., field programmable gate array or an application-specific integrated circuit or purpose-built semiconductor). In such cases, the hardware circuits can be configured to process logical ones and zeros much in the same way software operates to carry out the functionality as variously provided herein, albeit potentially faster depending on clocking speeds, but at a greater production cost. In another example embodiment, one or more of the circuits can be implemented as a microcontroller having input/output ports along with a number of executable routines embedded therein and executable by an onboard processor. The microcontroller could thus receive the target input image, process the image to identify and correct sentiment, and output a corrected image or a set of control signals that direct the correction of the image.

As will be further appreciated, note that the degree of modularity or integration may vary from one embodiment to the next, and the present disclosure is not intended to be limited to the specific configurations shown in FIGS. 1a and 1b. For example, other embodiments may be configured such that all of circuits 101 through 111 are implemented in a single functional circuit, rather than the individual discrete circuits as shown. Likewise, each of circuits 101 through 111 can be implemented within circuit 113. Further note that the functionality of the circuits may be captured in a computer program product having one or more non-transitory machine readable mediums having instructions encoded thereon that when executed by one or more processors cause the corresponding functionality to be carried out. Numerous other such embodiments, configurations, and instantiations of the subject matter provided herein will be appreciated in light of this disclosure.

Facial Data Analysis

Figure 3A:
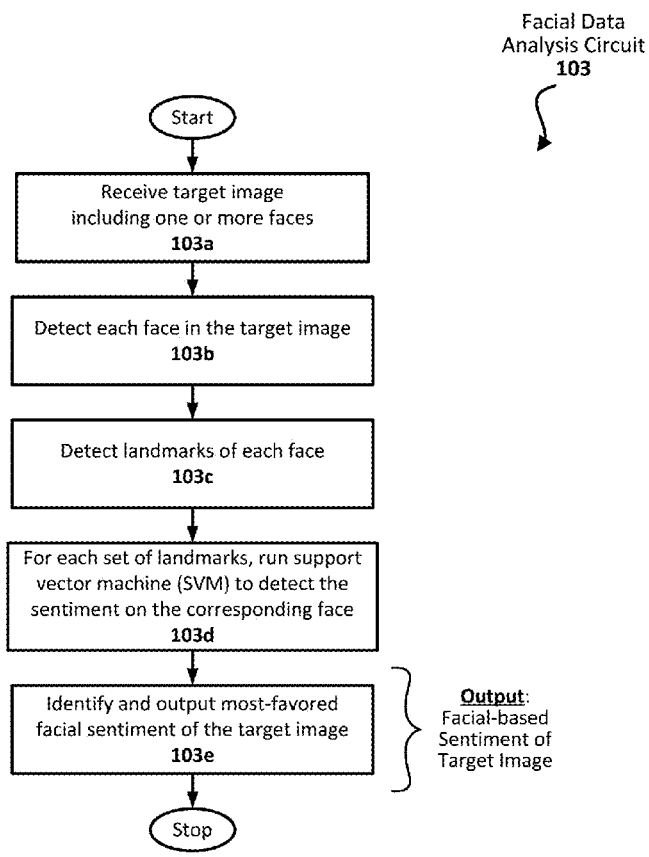
FIG. 3a illustrates processing carried out by a facial data analysis circuit configured to determine facial-based sentiment of a portrait image, in accordance with an embodiment of the present disclosure.

FIG. 3a illustrates processing carried out by a facial data analysis circuit configured to determine facial-based sentiment of a portrait image, in accordance with an embodiment of the present disclosure. The process may be carried out, for example, by the facial data analysis circuit 103 of FIG. 1a, but other configurations can be used as well, as will be appreciated in light of this disclosure.

As can be seen, the process of this example embodiment includes receiving 103a a target image including one or more faces. The target image may be, for instance, an image such as the one shown in FIG. 2b that is selected by a user for sentiment correction, and then provided to the facial data analysis circuit 103 by the input/request circuit 101. The process continues with detecting 103b each face in the target image, and detecting 103c landmarks of each face. Without loss of generality, the facial data analysis circuit 103 can be trained to detect and identify following sentiments: joy, sadness, neutral, surprise, anger, disgust, and fear, according to one example embodiment of the present disclosure. FIGS. 3b through 3h show example faces depicting these sentiments as well as the landmarks that can be automatically detected on each face.

With further reference to FIG. 3a, for each set of landmarks detected at 103c, the process continues with running 103d a support vector machine (SVM) or other suitable machine learning/classification too to detect the sentiment on the corresponding face. Note that other types of supervised machine learning and classification methodology can be used, such as artificial neural networks, or a combination of SVM and neural networks, along with Bayesian classification. Any number of such machine learning tools and classifiers can be trained to detect and classify different facial expressions of interest. In any such cases, as a result when presented with a target image with one or more faces, the SVM or other machine learning tool output is the sentiment detected on a given face. Face-sentiment pairings can thus be made and used to inform subsequent image editing.

In more detail, for example, for each desired sentiment category, multiple facial samples can be collected and used to train a support vector machine (SVM) on the various attendant landmark arrangements. So, when typical facial expressions such as those depicted in FIGS. 3b through 3h are processed through the trained SVM, the corresponding sentiment can be readily identified. While the distinctions of the various sentiment-indicating landmark sets may be relatively subtle to the human or otherwise untrained eye, a well-trained supervised machine learning and classification process is well-suited to identify such subtle distinctions, as will be appreciated. Each of the example sentiment-indicating landmark sets depicted in FIGS. 3b-3h can be identified and classified by the facial data analysis circuit 103, and will now be discussed in turn.

Figure 3B:
FIG. 3b-3h illustrate various example facial expressions and the various landmarks associated therewith that can be used to identify a corresponding facial sentiment, in accordance with an embodiment of the present disclosure.

FIG. 3b shows an example face portraying the sentiment of joy. The sentiment-indicating landmarks used in this example embodiment include the general areas including the eyebrows, eyes, nose, mount/lips, and jawline. As can be seen, these landmarks provide tell-tale signs of a given sentiment. In the case of joy as depicted in FIG. 3b, these tell-tale signs include one or more of the following: smiling lines underneath the eyes, a curved nostril line, a smiling mouth (corners of mouth relatively high compared to center of mouth), raised eyebrows, and a relatively tightened smooth jawline (the act of smiling tends to tighten the skin in the jawline area).

Figure 3C:
Figure 3D:

FIG. 3c shows an example face portraying the sentiment of sadness using the same set of landmarks, with the tell-tale signs including one or more of a frowning mouth (corners of mouth relatively low compared to center of mouth), lowered eyebrows (relative to joy), a lack of smiling lines underneath the eyes, less curved nostril line (relative to joy), and frown lines in the jawline. FIG. 3d shows an example face portraying the sentiment of neutrality using the same set of landmarks, with the tell-tale signs including one or more of a lack of smiling lines underneath the eyes combined with a lack of frown lines in the jawline, a neutral pose of eyes, mouth, and nostril line (relative to joy and sadness) as indicated for instance by a straight brow line, a straight nostril line, and straight mouth line.

Figure 3E:
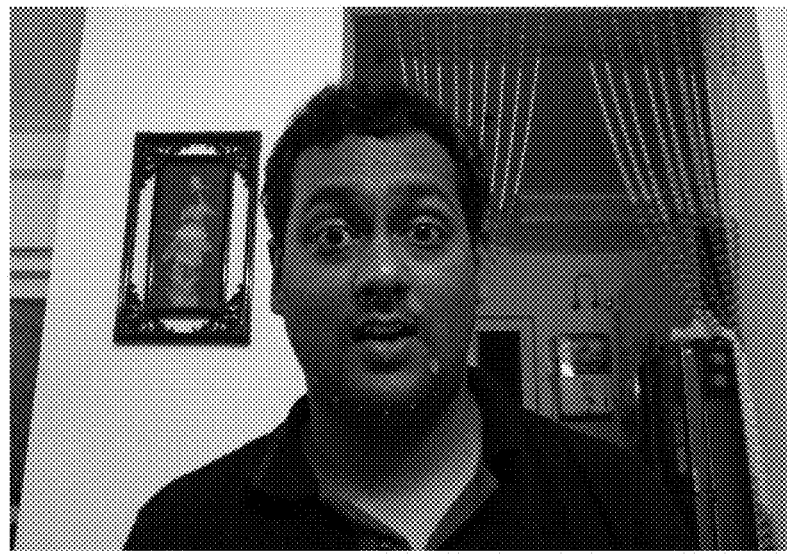
Figure 3F:

FIG. 3e shows an example face portraying the sentiment of surprise using the same set of landmarks, with the tell-tale signs including one or more of a highly raised brow and widened eyes (relative to joy and neutral), an open mouth or parted lips, and a lack of smiling lines underneath the eyes combined with a lack of frown lines in the jawline. FIG. 3f shows an example face portraying the sentiment of anger using the same set of landmarks, with the tell-tale signs including one or more of a relatively straight brow and narrowed eyes (relative to joy and neutral), anger lines at top of nose between eyes, a relatively straight and tightened mouth line (relative neutral), and a lack of smiling lines underneath the eyes combined with a lack of frown lines in the jawline.

Figure 3G:
Figure 3H:

FIG. 3g shows an example face portraying the sentiment of disgust using the same set of landmarks, with the tell-tale signs including one or more of a relatively straight but raised brow combined with brow lines and narrowed eyes (relative to joy and neutral), a relatively straight but elongated or pursed mouth line (relative to neutral), and a lack of smiling lines underneath the eyes combined with a lack of frown lines in the jawline. FIG. 3h shows an example face portraying the sentiment of fear using the same set of landmarks, with the tell-tale signs including one or more of a highly raised brow combined with wide open eyes, a slightly open mouth or parted lips, and a lack of smiling lines underneath the eyes combined with a lack of frown lines in the jawline.

Once the sentiment for each face in the target image is identified by the circuit 103, and with further reference to FIG. 3a, the process continues with identifying and outputting 103e a most-favored facial sentiment of the target image. As previously explained, the most-favored sentiment can be, for example, the only sentiment detected in a given image, or a most frequently occurring sentiment based on multiple sentiments detected and tallied for a given image. In still other embodiments, note that the actual facial-based sentiments depicted in a given image can be overruled by non-facial sentiments that are detected by evaluating other aspects of associated with the image (such as related images, geo data of the target image, and textual content associated with the image), as will be appreciated in light of this disclosure. In any case, the facial data analysis circuit 103 is programmed or otherwise configured to output a facial-based sentiment of target image.

Related Image Analysis

Figure 4:
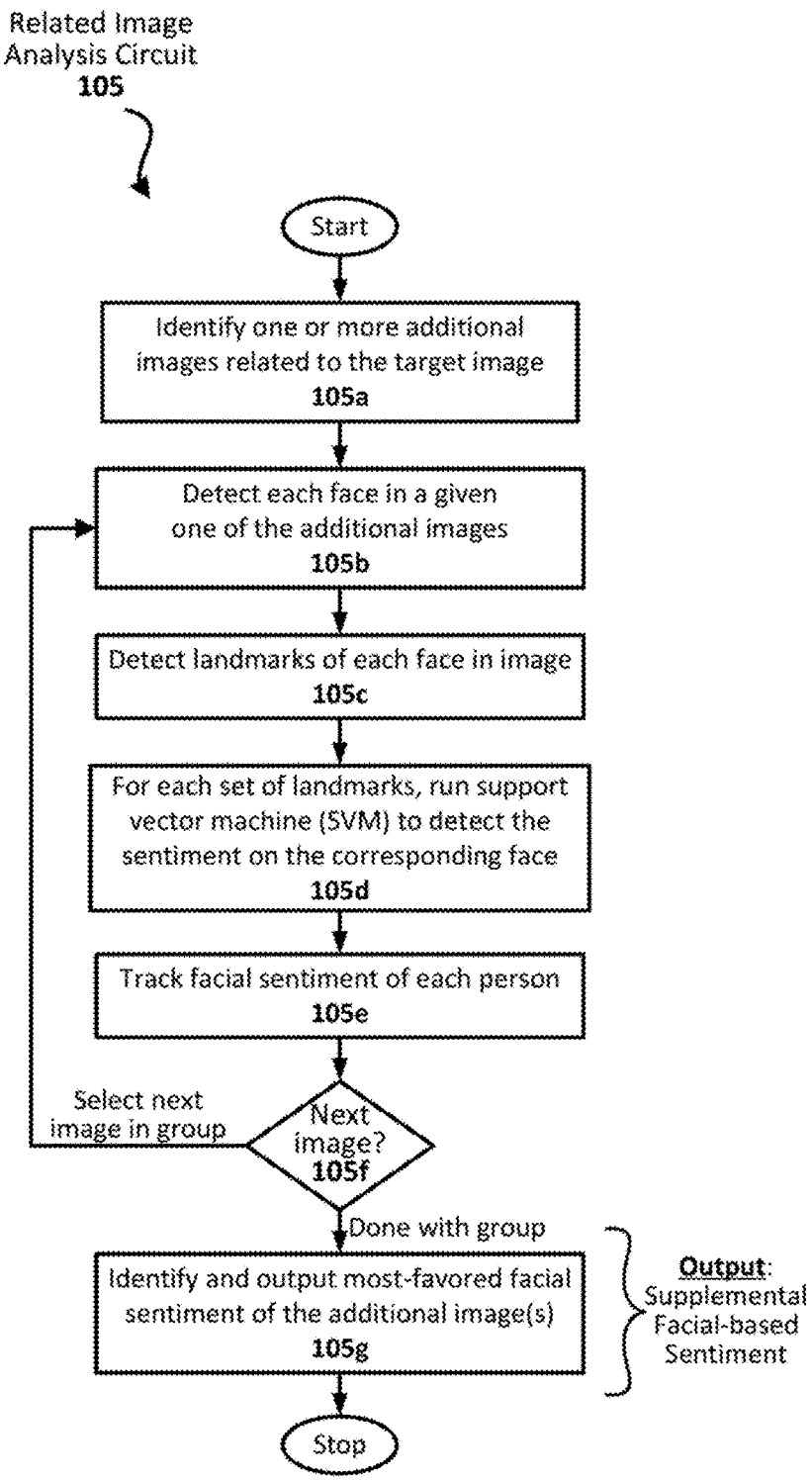
FIG. 4 illustrates processing carried out by a related image analysis circuit configured to determine supplemental facial-based sentiment of a portrait image, in accordance with an embodiment of the present disclosure.

FIG. 4 illustrates processing carried out by a related image analysis circuit configured to determine supplemental visual-based sentiment of a portrait image, in accordance with an embodiment of the present disclosure. The process may be carried out, for example, by the related image analysis circuit 105 of FIG. 1a, but other configurations can be used as well, as will be appreciated in light of this disclosure.

As can be seen, the process of this example embodiment includes identifying 105a one or more additional images related to the target image. As previously explained, related images include, for example, all the digital photos taken near the same place and at a similar time as the target image. These related images can be local images (e.g., stored in memory of a stand-alone computing system) and/or remote images (e.g., stored in cloud-based storage service accessible to client computing system via a communication network). In some such embodiments, timestamps and GPS tags embedded in the additional images are evaluated by the related image analysis circuit 105 to identify whether they are actually related to the target image, or not. Once these additional related images are identified, the process continues with detecting 105b each face in a given one of the additional images, and detecting 105c landmarks of each face in that image. Then, for each set of landmarks, the process continues with running 105d a support vector machine (SVM) or other suitable machine learning classifier to detect the sentiment on the corresponding face. As will be appreciated, this related image processing at 105b through 105d can be carried out in a similar fashion as described with reference to the target image processing at 103b through 103d of FIG. 3a.

The process further includes, however, tracking 105e the facial sentiment of each person captured in the additional related images. As one can imagine, a group of images from a given event may show the various people in attendance in multiple images. Thus, each person captured in the group of images can be assigned an overall tally of sentiments (e.g., at the images from the company picnic last weekend, Phaneendra was captured in three different photos and was joyous in all three, Lance was captured in four different photos and was joyous in three and surprised in one, and Anmol was captured in four different photos and was joyous in two and surprised in two).

At 105f, the process determines if additional related images are available. If so, the next image in the group is selected and processed at 105b through 105e. Once the processing the image group is complete (as determined at 105f), the process continues with identifying and outputting 105g a most-favored facial sentiment of the additional image(s). As will be appreciated in light of this disclosure, such a supplemental facial-based sentiment can be used to confidence check the sentiment determination made with respect to the target image made at 103e, according to some embodiments. Thus, once all of the identified related images are processed, a confidence measure is effectively provided for each person depicted. Such processing can be used to give us an increased understanding of the group's sentiment at a higher level and thus helps in attaining the target image sentiment in a better fashion. The most-favored facial sentiment of the additional image(s) output is the sentiment favored by most of the people, according to some embodiments. So, in the example above regarding the images from the company picnic, the most-favored sentiment would be joy (eight occurrences of joy, with three occurrences of surprise).

Geo Data Analysis

Figure 5:
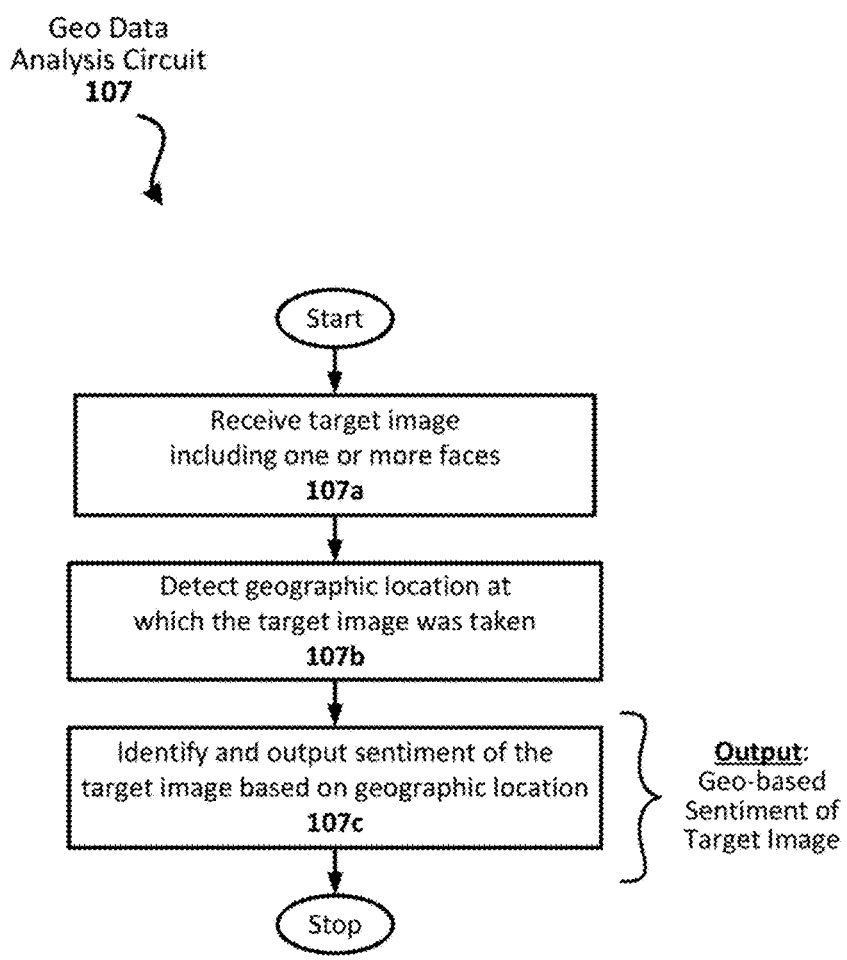
FIG. 5 illustrates processing carried out by a geo data analysis circuit configured to determine geo-based sentiment of a portrait image, in accordance with an embodiment of the present disclosure.

FIG. 5 illustrates processing carried out by a geo data analysis circuit configured to determine geo-based sentiment of a portrait image, in accordance with an embodiment of the present disclosure. The process may be carried out, for example, by the geo data analysis circuit 107 of FIG. 1a, but other configurations can be used as well, as will be appreciated in light of this disclosure.

As can be seen, the process of this example embodiment includes receiving 107a a target image including one or more faces, and detecting 107b the geographic location at which the target image was taken. As previously explained, many camera devices are coupled with a GPS receiver which allows that camera device to embed GPS coordinate (or other locationing coordinates) with each image taken be that camera. Thus, the geo data analysis circuit 107 can configured to extract that GPS tag from the target image, in a similar manner as employed by the related image analysis circuit 105. If no embedded coordinate data is available to assist in identifying the geographic location at which the image was captured, then the geo data analysis circuit 107 can be further programmed or configured to identify features like street addresses and famous landmarks and waypoints in the target image, as previously explained. In any such cases, once actionable geo data is extracted by the geo data analysis circuit 107, that geo data can be used to further identify sentiment associated with that corresponding geographic location. In some embodiments, for instance, extracted GPS coordinates are converted to a place or street address that exists at those coordinates and where the image was taken (e.g., conversion can be done, for example, using free services such as http://www.gps-coordinates.net/gps-coordinates-converter, or otherwise coding such functionality directly into the geo data analysis circuit 107). From this place/address information, a determination can be made as to the overall sentiment of that place (e.g., park or lake, a hiking trail, a wedding parlor, a house of worship, a cemetery, etc.). In one particular embodiment, a database or look-up table is used to maintain a default sentiment for a variety of places indexed by GPS coordinates. So, in one example embodiment, when a target image is presented, the geo data analysis circuit 107 is programmed to extract the embedded GPS coordinates and use those coordinates to index into the database to identify the corresponding sentiment. Numerous such schemes will be apparent in light of this disclosure. In any case, the process continues with identifying and outputting 107c sentiment of the target image based on geographic location.

Textual Analysis

Figure 6:
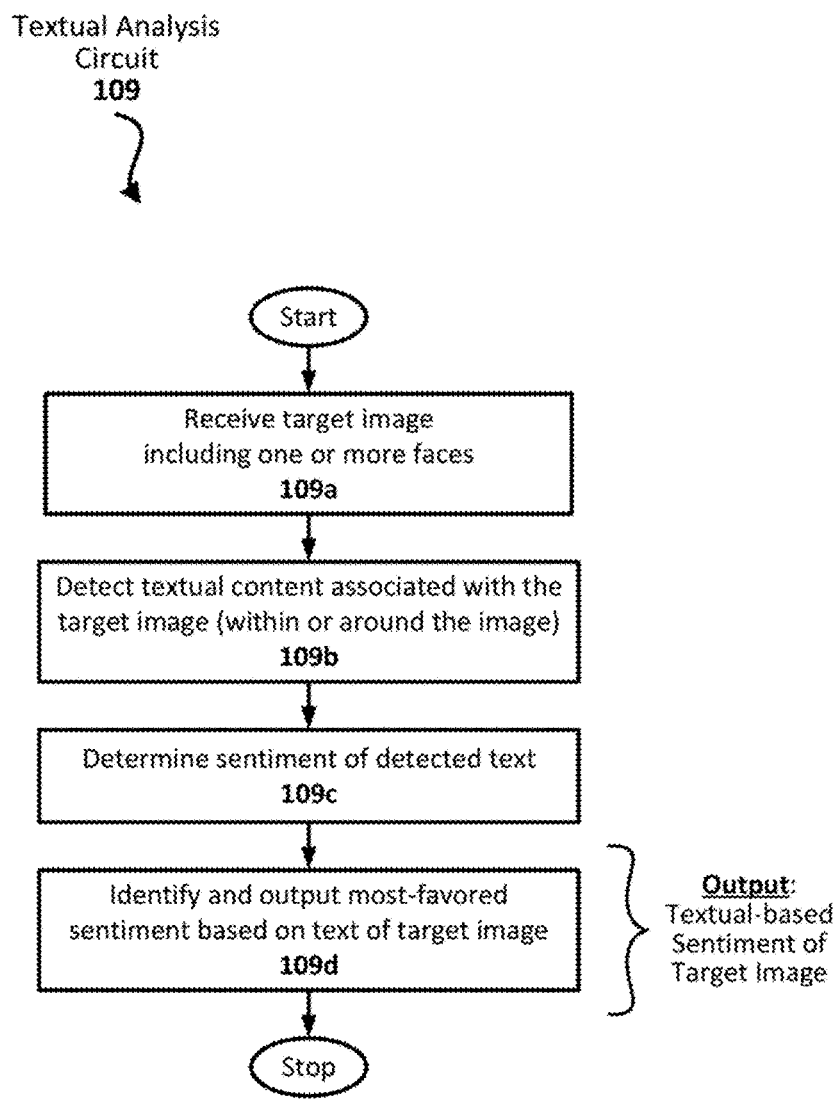
FIG. 6 illustrates processing carried out by a textual analysis circuit configured to determine textual-based sentiment of a portrait image, in accordance with an embodiment of the present disclosure.

FIG. 6 illustrates processing carried out by a textual analysis circuit configured to determine textual-based sentiment of a portrait image, in accordance with an embodiment of the present disclosure. The process may be carried out, for example, by the textual analysis circuit 109 of FIG. 1a, but other configurations can be used as well, as will be appreciated in light of this disclosure.

As can be seen, the process of this example embodiment includes receiving 109a a target image including one or more faces, and detecting 109b textual content associated with the target image (within or around the image). As previously explained, the text may be, for example, present inside the image, present in an encompassing web page if the image is taken from the Internet, or present around the image in a lay-out tool like Adobe® Comp CC or other project creation application. In the case of text present in the image itself, the textual analysis circuit 109 can be programmed or otherwise configured to perform optical character recognition (OCR) on the image to extract the text out. In other cases where the text is external to the image, the text is likely already available in a format suitable for analysis (e.g., ASCII or other text format).

Once the text associated with the target image is in hand, the process continues with determining 109c the sentiment of the detected text. In some embodiments, for I instance, textual analysis circuit 109 is configured to pass that text through a standard sentiment analysis engine for text to obtain the textual-based sentiment. Any number of known text-based sentiment analysis techniques can be used. In any case, the process continues with identifying and outputting 109d a most-favored sentiment based on text of target image. Previous discussion about the meaning of most-favored is equally applicable here.

Thus, each of the facial data analysis circuit 103, related image analysis circuit 105, geo data analysis circuit 107, and textual analysis circuit 109, or some subset thereof, outputs a most-favored sentiment associated with the target image in some way. The voting circuit can thus receive those various sentiments and determine an overall or otherwise winning sentiment based on those one or more sentiments provided. The winning sentiment can then be used to auto-correct sentiment in the target image, as will now be explained in further detail with reference to FIGS. 7 and 8.

Identification and Application of Winning Sentiment

Figure 7:
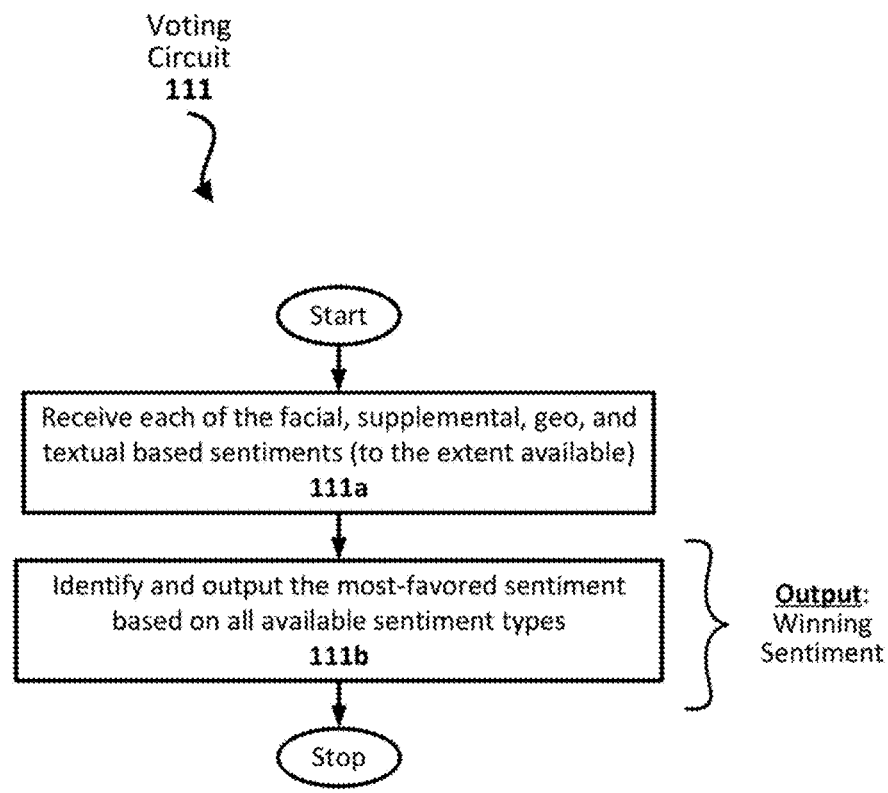
FIG. 7 illustrates processing carried out by a voting circuit configured to identify a winning sentiment among a plurality of sentiments associated with a portrait image, in accordance with an embodiment of the present disclosure.

FIG. 7 illustrates processing carried out by a voting circuit configured to identify a winning sentiment among a plurality of sentiments associated with a portrait image, in accordance with an embodiment of the present disclosure. The process may be carried out, for example, by the voting circuit 111 of FIG. 1a, but other configurations can be used as well, as will be appreciated in light of this disclosure.

As can be seen, the process of this example embodiment includes receiving 111a one or more of the facial-based sentiment (from target image), supplemental facial-based sentiment (from related images), geo-based sentiment (from target image), and textual based sentiments (from the target image). The process continues with identifying and outputting 111b the most-favored sentiment based on all available sentiment types to identify the overall winning sentiment. In one example embodiment, the winning sentiment is the sentiment favored by most of the sentiment computing methods employed (e.g., the sentiments provided by each of the facial data analysis circuit 103, related image analysis circuit 105, geo data analysis circuit 107, and textual analysis circuit 109). The voting circuit 111 can thus declare that sentiment as the winning or final sentiment of the target image.

Figure 8:
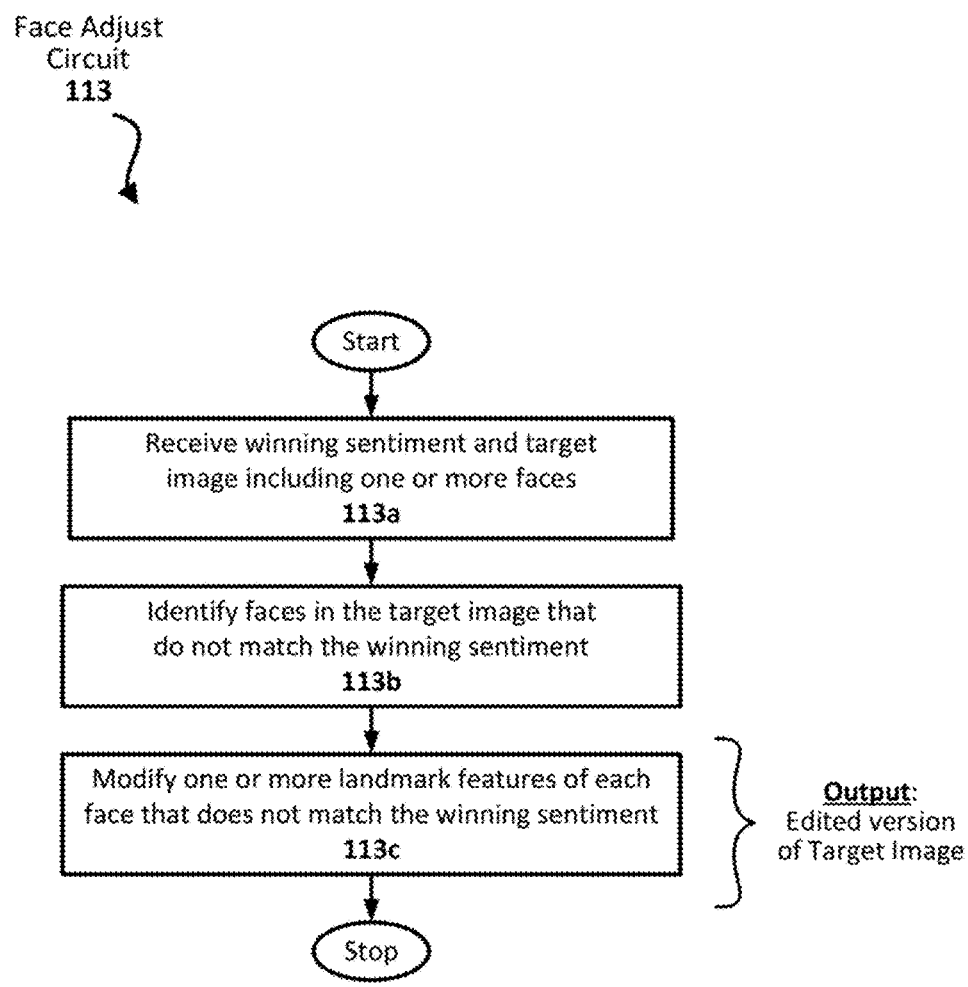
FIG. 8 illustrates processing carried out by a face adjust circuit configured to adjust landmark features of a face in a portrait image based on a desired sentiment, in accordance with an embodiment of the present disclosure.

FIG. 8 illustrates processing carried out by a face adjust circuit configured to adjust landmark features of a face in a portrait image based on a desired sentiment, in accordance with an embodiment of the present disclosure. The process may be carried out, for example, by the face adjust circuit 113 of FIG. 1a, but other configurations can be used as well, as will be appreciated in light of this disclosure.

As can be seen, the process of this example embodiment includes receiving 113a the winning sentiment and the target image including one or more faces. Note that, in some embodiments, the face adjust circuit 113 may also receive the face-sentiment pairs from the facial data analysis circuit 103, wherein each face-sentiment pair identifies a face and the sentiment currently expressed on that face. This way, the face adjust circuit 113 can leverage previous work done by the facial data analysis circuit 103, rather than having to further analyze faces in the target image.

In any case, the process continues with identifying 113b faces in the target image that do not match the winning sentiment. Again, this can be done by further analysis of the faces in the image, or by reviewing the face-sentiment pairs from the facial data analysis circuit 103 as explained above. For each non-compliant face in the target image, the process continues with modifying 113c one or more landmark features of that face. So, for example, a neutral face can be changed to a joyous face by adjusting the mouth line so that the corners of the mouth are relatively higher than the middle of the mouth (as shown in the example use case depicted in FIGS. 2b-2c). Likewise, smile lines can be added to eye area. In another example use case, a face seemingly exhibiting joy at a somber event can be adjusted to have the mouth line be more flat so that the mouth corners are about the height as the center of the mouth. In a more general sense, pixels in any of the landmark feature areas can be manipulated to add, modify, or take away a facial feature, so that area can better represent the target sentiment provided by the voting circuit 111.

As will be appreciated in light of this disclosure, changes to a given face can be executed by automating the actions that would otherwise be made manually, once an area of the target image to be changed is identified. So, for instance, the face adjust circuit 113 can be programmed to identify which landmark areas are to be changed based on the non-compliant sentiment of the target image and the winning sentiment. If correcting an image from neutral to joy, for example, the mouth landmarks would be changed to provide a smiling mouth line. In such cases, the face adjust circuit 113 could be programmed to identify the mouth area of the image (e.g., using standard classification and segmentation) and to manipulate pixels of the image in that mouth area according to a pre-established set of rules or logic. The rule might be, for example, identify pixels at current corners of mouth and raise those pixels by 10 to 15 pixels, and then repeat this pixel raising process in a sequential manner, moving inward along the mouth line, so as to indicate a subtle to moderate upwardly curved mouth line. Any number of pixel manipulation techniques (e.g., sampling, copying, pasting, color changing, shading, to name a few examples) can be used to bring about subtle to moderate changes to a given facial landmark to in turn apply a winning sentiment to that face. Each such facial landmark manipulation can be programmed into a pre-established routine, as will be appreciated in light of this disclosure, whether that routine is configured to take away currently existing features (e.g., take away frown lines or brow lines), or add missing features (e.g., add smile lines, smiling mouth), or a combination of such subtractions and additions.

In still other embodiments, note that not all non-compliant faces need to be changed. For example, if the winning sentiment is joy and one face in the target image is expressing surprise, then the face adjust circuit 113 may be programmed or otherwise configured to leave the surprise sentiment as is, as the sentiment of surprise is similar to or otherwise appropriate in the context of a joyous occasion. Such determinations can be implemented, for example, using a predetermined set of rules or logic (e.g., if winning sentiment is joy and detected sentiment is one of joy or surprise, then no change; similarly, if winning sentiment is anger and detected sentiment is one of anger or neutral or disgust, then no change). Numerous such pre-established rules can be coded into circuit 113.

A number of benefits associated with some embodiments of the present disclosure will be appreciated. For example, the techniques provided herein can be used for automatically editing expressions of people in an image in a context-aware fashion, according to some embodiments. Likewise, the techniques can be used to inform additional editing processes, such as the process of determining which type of supplemental content (e.g., such frames/borders, fonts, colors, and other artistic aspects) corresponds to the mood of the target image. Likewise, the techniques can be used to determine what kind of ads make sense or otherwise correspond with a certain image on a web page or advertising material. In still other embodiments, once a sentiment for a given multimedia project is known, a query can be made to an image catalog to retrieve images having a particular sentiment. In some such embodiments, the image database could be indexed by sentiment to facilitate the retrieval process. Such image search techniques could be used to replace a non-compliant image, rather than attempting to repair or otherwise correct that image. In still other embodiments, once a given image is assessed for sentiment, further decisions can be automatically made regarding use of that image. For instance, in one such embodiment, the application may be further programmed or otherwise configured to identify which effects (e.g., color based effects, or and in a more general sense, any artistic effects) make more sense for the given sentiment captured in the target photograph. Such automatic suggestions or selections may be helpful to an author or other user using sentiment-bearing images. Numerous other such benefits, applications, and use cases will be apparent in light of this disclosure, and the present disclosure is not intended to be limited to any particular ones.

FURTHER EXAMPLE EMBODIMENTS

Numerous example variations and configurations will be apparent in light of this disclosure.

Example 1 is a computer-implemented method for automatically correcting facial sentiment of a digital image. The method includes: receiving a request to correct facial sentiment in a given target image; analyzing facial data of the target image to obtain facial-based sentiment; determining a winning sentiment based on the facial-based sentiment; and applying the winning sentiment to at least one face included in the target image.

Example 2 includes the subject matter of Example 1, wherein analyzing facial data of the target image to obtain facial-based sentiment includes: detecting each face in the target image; detecting landmarks of each detected face; processing, with supervised machine learning and classification, the landmarks for each face to detect the sentiment on the corresponding face; and identifying and outputting a most-favored facial sentiment of the target image, the most-favored sentiment being the facial-based sentiment of target image.

Example 3 includes the subject matter of Example 2, wherein the supervised machine learning and classification used to process the landmarks for each face to detect the sentiment on the corresponding face is carried out using a support vector machine (SVM). In still other example cases, a neural network can be used. Any number of machine learning techniques can be used.

Example 4 includes the subject matter of any of the previous Examples, and further includes at least one of: analyzing other images related to the target image to obtain supplemental facial-based sentiment; analyzing geo data of the target image to obtain geo-based sentiment; and analyzing textual data associated with the target image to obtain textual-based sentiment. In any such cases, the winning sentiment can be further based on at least one of the text-based sentiment, the supplemental facial-based sentiment, and the geo-based sentiment.

Example 5 includes the subject matter of Example 4, wherein the other images are related to the target image based on the time and location at which they were captured. Such images might be, for example, from a group of digital images captured at an event or venue, and therefore include a number of common faces and features associated with the target image.

Example 5 includes the subject matter of Example 4 or 5, wherein analyzing other images related to the target image to obtain supplemental facial-based sentiment includes: identifying one or more additional images related to the target image; detecting each face in the additional images; detecting landmarks of each face; processing, with supervised machine learning and classification, the landmarks for each face to detect the sentiment on the corresponding face; tracking facial sentiment of each person captured in the additional images; and identifying and outputting a most-favored facial sentiment of the additional images, the most-favored sentiment being the supplemental facial-based sentiment of target image.

Example 7 includes the subject matter of Example 6, wherein the supervised machine learning and classification used to process the landmarks for each face to detect the sentiment on the corresponding face is carried out using a support vector machine (SVM). Again, other comparable machine learning techniques can be used here as well.

Example 8 includes the subject matter of any of Examples 4 through 7, wherein analyzing geo data of the target image to obtain geo-based sentiment includes: detecting the geographic location at which the target image was captured; and identifying and outputting a sentiment of the target image based on geographic location, the sentiment being the geo-based sentiment of target image.

Example 9 includes the subject matter of any of Examples 4 through 8, wherein analyzing textual data associated with the target image to obtain textual-based sentiment includes: detecting textual content associated with the target image, wherein the textual content is at least one of within and proximate to the target image; determining sentiment of the detected text; and identifying and outputting a most-favored sentiment based on text of target image, the most-favored sentiment being the textual-based sentiment of target image.

Example 10 includes the subject matter of any of the previous Examples, wherein applying the winning sentiment to at least one face included in the target image includes: identifying faces in the target image that do not match the winning sentiment; and modifying one or more landmark features of each face that does not match the winning sentiment, thereby producing an edited version of the target image.

Example 10 includes the subject matter of any of the previous Examples, wherein the method is part of a cloud-based service. The cloud-based service may be available to a user, for example, via a communication network, such as a wireless local area network operatively coupled with the Internet, or a private campus-wide network.

Examples 12 through 21 each is a computer program product including one or more non-transitory machine readable mediums encoded with instructions that when executed by one or more processors cause a process to be carried out for automatically correcting facial sentiment of a digital image, the process including the method of any of the previous Examples. The machine readable medium(s) can be any non-transitory means for storing processor-executable instructions, such as a hard-drive, read only memory (ROM), random access memory (RAM), compact disc, server, thumb drive, magnetic tape, on-board memory, hardware register, processor cache memory, flash memory, and solid-state memory, to name a few physical memory examples.

Example 22 is a system for automatically correcting facial sentiment of a digital image. The system includes: an input/request circuit to receive a request to correct facial sentiment in a given target image; a facial data analysis circuit to analyze facial data of the target image to obtain facial-based sentiment; a voting circuit to determine a winning sentiment based on the facial-based sentiment; and a face adjust circuit to apply the winning sentiment to at least one face included in the target image.

Example 23 includes the subject matter of Example 22, wherein the facial data analysis circuit analyzes facial data of the target image to obtain facial-based sentiment by: detecting each face in the target image; detecting landmarks of each detected face; processing, with supervised machine learning and classification, the landmarks for each face to detect the sentiment on the corresponding face; and identifying and outputting a most-favored facial sentiment of the target image, the most-favored sentiment being the facial-based sentiment of target image.

Example 24 includes the subject matter of Example 23, wherein the supervised machine learning and classification used to process the landmarks for each face to detect the sentiment on the corresponding face is carried out using a support vector machine (SVM).

Example 25 includes the subject matter of any of Examples 22 through 24, and further includes at least one of: a related image analysis circuit to analyze other images related to the target image to obtain supplemental facial-based sentiment; a geo data analysis circuit to analyze geo data of the target image to obtain geo-based sentiment; and a textual analysis circuit to analyze textual data associated with the target image to obtain textual-based sentiment. In such cases, the voting circuit determines the winning sentiment based on at least one of the text-based sentiment, the supplemental facial-based sentiment, and the geo-based sentiment.

Example 26 includes the subject matter of Example 26, wherein the other images are related to the target image based on the time and location at which they were captured. In some such cases, the related image analysis circuit analyzes other images related to the target image to obtain supplemental facial-based sentiment by: identifying one or more additional images related to the target image; detecting each face in the additional images; detecting landmarks of each face; processing, with supervised machine learning and classification, the landmarks for each face to detect the sentiment on the corresponding face; tracking facial sentiment of each person captured in the additional images; and identifying and outputting a most-favored facial sentiment of the additional images, the most-favored sentiment being the supplemental facial-based sentiment of target image.

Example 27 includes the subject matter of Example 26, wherein the supervised machine learning and classification used to process the landmarks for each face to detect the sentiment on the corresponding face is carried out using a support vector machine (SVM).

Example 28 includes the subject matter of any of Examples 25 through 27, wherein the geo data analysis circuit analyzes geo data of the target image to obtain geo-based sentiment by: detecting the geographic location at which the target image was captured; and identifying and outputting a sentiment of the target image based on geographic location, the sentiment being the geo-based sentiment of target image.

Example 29 includes the subject matter of any of Examples 25 through 28, wherein the textual analysis circuit analyzes textual data associated with the target image to obtain textual-based sentiment by: detecting textual content associated with the target image, wherein the textual content is at least one of within and proximate to the target image; determining sentiment of the detected text; and identifying and outputting a most-favored sentiment based on text of target image, the most-favored sentiment being the textual-based sentiment of target image.

Example 30 includes the subject matter of any of Examples 24 through 29, wherein the face adjust circuit applies the winning sentiment to at least one face included in the target image by: identifying faces in the target image that do not match the winning sentiment; and modifying one or more landmark features of each face that does not match the winning sentiment, thereby producing an edited version of the target image.

Example 31 includes the subject matter of any of Examples 24 through 30, wherein the system is part of a cloud-based service.

The foregoing description of example embodiments of the present disclosure has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A computer-implemented method for automatically correcting facial sentiment of a digital image, the method comprising:
   receiving a request to correct facial sentiment in a given target image;
   analyzing facial data of the target image to obtain facial-based sentiment;
   determining a winning sentiment based on the facial-based sentiment; and applying the winning sentiment to at least one face included in the target image, wherein applying the winning sentiment comprises
    identifying faces in the target image that do not match the winning sentiment; and
    modifying one or more landmark features of each face that does not match the winning sentiment, thereby producing an edited version of the target image.

2. The method of claim 1, wherein analyzing facial data of the target image to obtain the facial-based sentiment comprises:
    detecting a face in the target image;
    detecting landmarks of the detected face;
    processing, with supervised machine learning and classification, the landmarks of the detected face to obtain the facial-based sentiment; and
    identifying and outputting the winning sentiment.

3. The method of claim 2, wherein the supervised machine learning and classification used to process the landmarks of the detected face to obtain the facial-based sentiment is carried out using a support vector machine (SVM).

4. The method of claim 1, further comprising at least one of:
    analyzing other images related to the target image to obtain supplemental facial-based sentiment, wherein the other images are related to the target image based on a time and location at which they were captured;
    analyzing geo data of the target image to obtain geo-based sentiment; and
    analyzing textual data associated with the target image to obtain textual-based sentiment;
    wherein the winning sentiment is further based on at least one of the textual-based sentiment, the supplemental facial-based sentiment, and the geo-based sentiment.

5. The method of claim 4, wherein analyzing other images related to the target image to obtain the supplemental facial-based sentiment comprises:
    identifying one or more additional images related to the target image;
    detecting a face in the additional images;
    detecting landmarks of the detected face;
    processing, with supervised machine learning and classification, the landmarks of the detected face to obtain the supplemental facial-based sentiment;
    tracking supplemental facial-based facial sentiment of a plurality of people captured in the additional images; and
    identifying and outputting a most-favored facial sentiment of the additional images.

6. The method of claim 4, wherein analyzing geo data of the target image to obtain the geo-based sentiment comprises:
    detecting a geographic location at which the target image was captured; and
    identifying and outputting the geo-based a-sentiment of the target image based on the geographic location.

7. The method of claim 4, wherein analyzing textual data associated with the target image to obtain the textual-based sentiment comprises:
    detecting textual content associated with the target image, wherein the textual content is at least one of within and proximate to the target image;
    determining sentiment of the detected textual content; and
    identifying and outputting the textual-based sentiment of the target image based on the determined.

8. A computer program product including one or more non-transitory machine readable mediums encoded with instructions that when executed by one or more processors cause a process to be carried out for automatically correcting facial sentiment of a digital image, the process comprising:
    receiving a request to correct facial sentiment in a given target image;
    analyzing facial data of the target image to obtain facial-based sentiment;
    determining a winning sentiment based on the facial-based sentiment; and
    applying the winning sentiment to at least one face included in the target image, wherein applying the winning sentiment comprises
        identifying faces in the target image that do not match the winning sentiment; and
        modifying one or more landmark features of each face that does not match the winning sentiment, thereby producing an edited version of the target image.

9. The computer program product of claim 8, wherein analyzing facial data of the target image to obtain the facial-based sentiment comprises:
    detecting a face in the target image;
    detecting landmarks of the detected face;
    processing, with supervised machine learning and classification, the landmarks of the detected face to obtain the facial-based sentiment; and
    identifying and outputting the winning sentiment.

10. The computer program product of claim 9, the process further comprising at least one of:
    analyzing other images related to the target image to obtain supplemental facial-based sentiment;
    analyzing geo data of the target image to obtain geo-based sentiment; and
    analyzing textual data associated with the target image to obtain textual-based sentiment;
    wherein the winning sentiment is further based on at least one of the textual-based sentiment, the supplemental facial-based sentiment, and the geo-based sentiment.

11. The computer program product of claim 10, wherein the other images are related to the target image based on a time and location at which they were captured, and wherein analyzing the other images related to the target image to obtain the supplemental facial-based sentiment comprises:
    identifying one or more additional images related to the target image;
    detecting a face in the additional images;
    detecting landmarks of the detected face;
    processing, with supervised machine learning and classification, the landmarks of the detected face to obtain the supplemental facial-based sentiment;
    tracking supplemental facial-based sentiment of a plurality of people captured in the additional images; and
    identifying and outputting a most-favored facial sentiment of the additional images.

12. The computer program product of claim 10, wherein analyzing geo data of the target image to obtain the geo-based sentiment comprises:
    detecting a geographic location at which the target image was captured; and
    identifying and outputting the geo-based a-sentiment of the target image based on the geographic location.

13. The computer program product of claim 10, wherein analyzing textual data associated with the target image to obtain the textual-based sentiment comprises:
    detecting textual content associated with the target image, wherein the textual content is at least one of within and proximate to the target image;
    determining sentiment of the detected textual content; and identifying and outputting the textual-based sentiment of the target image based on the determined sentiment.

14. A system for automatically correcting facial sentiment of a digital image, comprising:
an input/request circuit to receive a request to correct facial sentiment in a given target image;
a facial data analysis circuit to analyze facial data of the target image to obtain facial-based sentiment;
a voting circuit to determine a winning sentiment based on the facial-based sentiment; and
a face adjust circuit to apply the winning sentiment to at least one face included in the target image, wherein the face adjust circuit applies the winning sentiment to at least one face included in the target image by
identifying faces in the target image that do not match the winning sentiment, and
modifying one or more landmark features of each face that does not match the winning sentiment, thereby producing an edited version of the target image.

15. The system of claim 14, wherein the facial data analysis circuit analyzes facial data of the target image to obtain facial-based sentiment by:
detecting each face in the target image;
detecting landmarks of each detected face;
processing, with supervised machine learning and classification, the landmarks for each face to detect the sentiment on the corresponding face, wherein the supervised machine learning and classification is carried out using a support vector machine (SVM); and
identifying and outputting a most-favored facial sentiment of the target image, the most-favored sentiment being the facial-based sentiment of target image.

16. The system of claim 14, further comprising at least one of:
a related image analysis circuit to analyze other images related to the target image to obtain supplemental facial-based sentiment;
a geo data analysis circuit to analyze geo data of the target image to obtain geo-based sentiment; and
a textual analysis circuit to analyze textual data associated with the target image to obtain textual-based sentiment;
wherein the voting circuit determines the winning sentiment based on at least one of the text-based sentiment, the supplemental facial-based sentiment, and the geo-based sentiment.

17. The system of claim 16, wherein the other images are related to the target image based on the time and location at which they were captured, and wherein the related image analysis circuit analyzes other images related to the target image to obtain supplemental facial-based sentiment by:
identifying one or more additional images related to the target image;
detecting each face in the additional images;
detecting landmarks of each face;
processing, with supervised machine learning and classification, the landmarks for each face to detect the sentiment on the corresponding face;
tracking facial sentiment of each person captured in the additional images; and
identifying and outputting a most-favored facial sentiment of the additional images, the most-favored sentiment being the supplemental facial-based sentiment of target image.

18. The system of claim 16, wherein:
the geo data analysis circuit analyzes geo data of the target image to obtain geo-based sentiment by
detecting the geographic location at which the target image was captured, and
identifying and outputting a sentiment of the target image based on geographic location, the sentiment being the geo-based sentiment of target image; and
the textual analysis circuit analyzes textual data associated with the target image to obtain textual-based sentiment by
detecting textual content associated with the target image, wherein the textual content is at least one of within and proximate to the target image,
determining sentiment of the detected text, and
identifying and outputting a most-favored sentiment based on text of target image, the most-favored sentiment being the textual-based sentiment of target image.

\* \* \* \* \*

UNITED STATES PATENT AND TRADEMARK OFFICE
CERTIFICATE OF CORRECTION

PATENT NO. : 10,198,791 B2
APPLICATION NO. : 15/236700
DATED : February 5, 2019
INVENTOR(S) : Srinivasa Madhava Phaneendra Angara, Lance Lewis and Anmol Dhawan Page 1 of 1

It is certified that error appears in the above-identified patent and that said Letters Patent is hereby corrected as shown below:

In the Claims

Column 17, Line 45, Claim 5, please replace "facial-based facial sentiment" with --facial-based sentiment--.

Column 17, Line 55, Claim 6, please replace "geo-based a-sentiment" with --geo-based sentiment--.

Column 17, Line 65, Claim 7, please replace "the determined." with --the determined sentiment.--.

Column 18, Line 59, Claim 12, please replace "geo-based a-sentiment" with --geo-based sentiment--.

Signed and Sealed this
Twenty-third Day of April, 2019

Andrei Iancu
*Director of the United States Patent and Trademark Office*